(12) United States Patent
Po-Hung et al.

(10) Patent No.: US 7,116,485 B2
(45) Date of Patent: Oct. 3, 2006

(54) APPARATUS OF LED FLAT LIGHT SIGNAL DISPLAY

(75) Inventors: Yao Po-Hung, Hsinchu (TW); Pao Yu-Nan, Zhubei (TW); Sun Yi-Ting, Taipei (TW); Chen Ming-Fong, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 121 days.

(21) Appl. No.: 11/024,655

(22) Filed: Dec. 30, 2004

(65) Prior Publication Data

US 2006/0082887 A1    Apr. 20, 2006

(30) Foreign Application Priority Data

Oct. 19, 2004  (TW) ............................. 93131613 A

(51) Int. Cl.
G02B 27/10 (2006.01)
H01K 1/30 (2006.01)
G09G 3/32 (2006.01)

(52) U.S. Cl. ..................... 359/626; 313/110; 313/111; 345/83

(58) Field of Classification Search ................ 313/110, 313/111, 500; 345/82, 83; 359/626, 800; 362/268
See application file for complete search history.

(56) References Cited

U.S. PATENT DOCUMENTS

| 6,196,691 B1 | 3/2001 | Ochiai ........................ 362/31 |
| 6,608,614 B1 | 8/2003 | Johnson ....................... 345/102 |
| 6,700,502 B1 | 3/2004 | Pederson ............... 340/815.45 |
| 6,756,893 B1 | 6/2004 | Fernandez .................. 340/458 |
| 6,809,470 B1 * | 10/2004 | Morley et al. .............. 313/500 |

FOREIGN PATENT DOCUMENTS

CN              290159              1/1985

* cited by examiner

*Primary Examiner*—David N. Spector
(74) *Attorney, Agent, or Firm*—Troxell Law Office, PLLC

(57) ABSTRACT

The present invention discloses an apparatus of LED flat light signal display, which comprises at least one light emitting diode, a plurality of flat microlens and at least one microlens set. The light emitting diode acts as a light source for discharging light. The flat microlens comprises a plurality of concentric serrated rings for collimating and converging convergence received from the light source. The microlens set comprises at least one microlens unit with a specific geometric shape for receiving light transmitted from the flat microlens to produce a light spot identical to the specific geometric shape, and the micro unit has a lateral side on its external edge to be disposed next to another lateral side of another micro unit to define a geometric plane. The present invention can provide a maximum viewing area with a minimum quantity of LEDs while being applied in dot matrix LED signals or imaging devices, and also make the images produced by the device smoother to enhance the comfort of viewing.

12 Claims, 6 Drawing Sheets

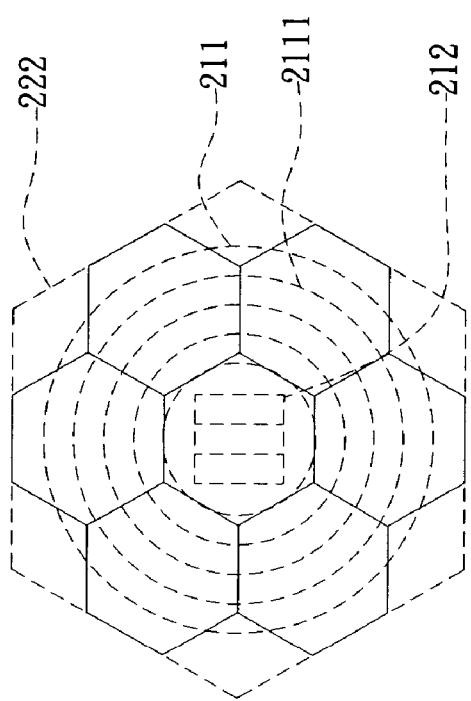
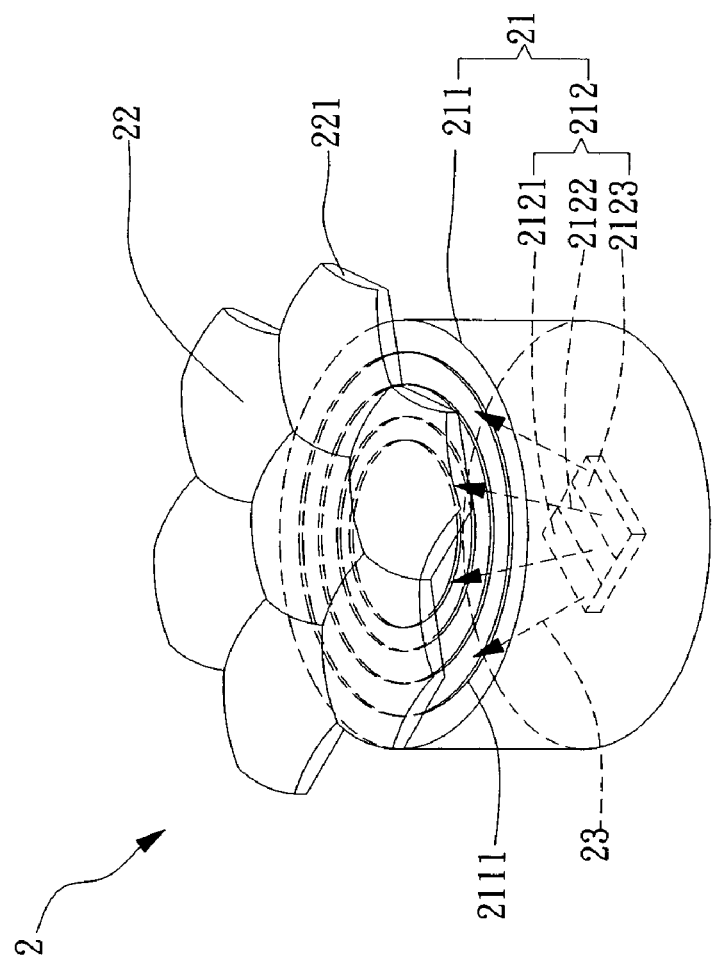
FIG. 2B
FIG. 2A

APPARATUS OF LED FLAT LIGHT SIGNAL DISPLAY

1. FIELD OF THE INVENTION

The present invention relates to an apparatus of LED flat light signal display, and more particularly, to a high efficiency direct view LED signal display apparatus incorporating a flat microlens and a microlens array.

2. BACKGROUND OF THE INVENTION

At present, light emitting diodes (LEDs) are commonly used in televisions, PC display devices, digital cameras, mobile phones, lamps, various sized billboards, traffic lights, and automobile warning lamps, etc. In recent years, the LED industry in Taiwan grows rapidly and has become the world's second largest supplier, just second to Japan. Therefore, the LED industry is considered as a blooming industry with a large business opportunity that is going to succeed the flat panel industry.

The Taiwan's LED industry shows a high growth in recent years and is expected to have a total annual output value of 25.3 billion NT dollars and a global market share of 21% (only second to Japan's 47%) by 2004, that Taiwan is the world's second largest LED supplier. The reason for LEDs to have such a fast growing market mainly resides in two driving forces. Firstly, the LED is being employed as the backlight source of display device; and secondly, the LED is being used as the replacement of the traditional incandescent light bulb and fluorescent lamp in the general light source market. In the foregoing two fast-growing markets, the LED has advantages on environmental protection, power saving and outstanding color performance; wherein the ban on mercury usage issued in 2006 by the environmental protection laws and regulations of European Union is the primary factor for driving the growth of these markets.

The conventional LED dot matrix signal display product as disclosed in the U.S. Pat. No. 6,756,893 is an LED assembly having a plurality of traditional LED module surrounding an automobile light, such as the headlight, taillight and signal light, etc., so that the LED surrounding a main lamp is enabled while the main lamp is malfunctioned.

Further, an LED warning lamp disclosed in the U.S. Pat. No. 6,700,502 comprises a plurality of LED modules disposed on a reflector, in which the LED module is a combination of LEDs of different colors.

A backlit light source device of TFT-LCD is disclosed in the U.S. Pat. No. 6,608,614, that the backlight device employs a waveguide to synthesize and redirect the light emitted from an LED module to an LCD panel so as to achieve the function of a backlit panel.

Further, a backlit module disclosed in the U.S. Pat. No. 6,196,691 is accomplished by installing an LED on the thicker part of a wedge-shaped light guide and adding an optical grating to assist the dispersion of light source. However, such arrangement only gives very little effect and is not suitable for large flat panel display.

Further, an LED assembly of billboard disclosed in the R.O.C. Pat. No. 290159 is accomplished by aligning a plurality of LED boards, each having a plurality of LED modules arranged thereon, to define a display billboard, so that the display billboard can show the required patterns by way of different arranging order of the LED modules.

In view of the foregoing description, most of the LED applications have the following shortcomings:

(1) Since the traditional LED arrays applied in signal devices, such as traffic lights, taillights, large outdoor billboards, etc., cannot be installed closely with each other, therefore it is general for a signal display applying traditional LED arrays to have a plurality of dark area seen on the surface of the signal device that shows an image formed by a plurality of light-dots, and is not a smooth and evenly lighted surface.

(2) The LED array used in signal devices, such as the traffic lights, taillights, large outdoor electronic billboards, etc., cannot achieve the smooth display effect under the prior-art structure. In addition, the LED array is not packaged by flat packaging, which increases the volume of the LED package and thus affects the smoothness of the image and text displayed on the signal device.

SUMMARY OF THE INVENTION

It is the primary objective of the invention to provide an apparatus of LED flat light signal display, capable of using a plurality of flat microlens and a microlens array arranged therein for reshaping light spots emitted by the LEDs thereof.

It is the secondary objective of the invention to provide an apparatus of LED flat light signal display, capable of tightly arranging the light spots reshaped by the cooperation of a plurality of flat microlens and a microlens array arranged therein and thus forming a flat geometric light-emitting source for displaying information smoothly.

It is another objective of the invention to provide an apparatus of LED flat light signal display, capable of enlarging a light emitting surface by the cooperation of a plurality of flat microlens and a microlens array arranged therein so as to provide a maximum light-emitting source with least amount of LEDs used in the signal display apparatus.

To achieve the foregoing objectives, the present invention provides an apparatus of LED flat light signal display, comprising at least a light emitting diode (LED), a plurality of flat microlens and at least a microlens set. The light emitting diode acts as a light source for emitting light. The flat microlens comprises a plurality of concentric serrated rings for performing the collimating and converging light received from the LED. The microlens set comprises at least one microlens unit with a specific geometric shape, each micro unit being capable of receiving the light emitted from the flat microlens to produce a light spot identical to the specific geometric shape, and the micro unit at its external edge has a lateral side to be disposed next to a lateral side of another micro unit, such that a geometric plane is defined by the totality of the plural micro units. The present invention can provide a maximum viewing area with a minimum quantity of LEDs while being applied in a dot matrix LED signal or an imaging device, and also can make the images produced by the device smoother to enhance the comfort of viewing.

BRIEF DESCRIPTION OF THE DRAWINGS

FIG. 2A is an illustrative view of the LED display apparatus according to a preferred embodiment of the present invention.

FIG. 2B is an illustrative view of a light spot formed by the LED display apparatus according to a preferred embodiment of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
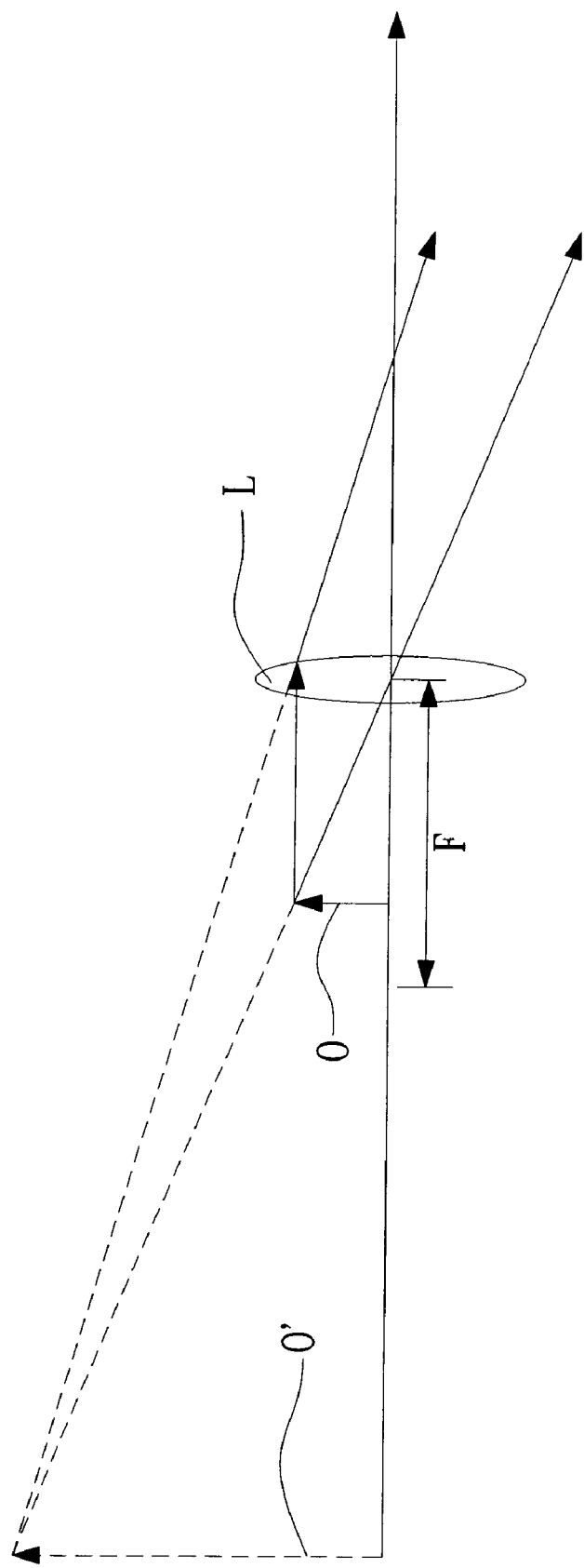
FIG. 1 is an illustrative diagram showing the imaging principle of the present invention.

Please refer to FIG. 1 for the imaging principle of the present invention. If an object O is situated within the focal length F of a lens L, an enlarged virtual image O' will be produced due to the focusing of virtual rays while viewing the object O from a side of the lens opposite to the object O being situated. That is, if the object O is a light spot and locates within the focal length F of the lens L, the light spot is enlarged and expanded while it is viewed from another side of the lens.

Please refer to FIG. 2A for the illustrative view of the LED display device according to a preferred embodiment of the present invention. The LED display device 2 comprises a lens light source section 21 and a microlens set 22. The light source section 21 comprises a flat microlens 211 and at least one light emitting diode 212. The flat microlens 211 comprises a plurality of concentric serrated rings 2111, and the pitch of the concentric serrated ring is 1 μm~500 μm. The light emitting diode 212 acts as a light source for discharging light 23 and is disposed on one side of the flat microlens 211, and the light emitting diode 212 comprises a red LED 2121, a blue LED 2122, and a green LED 2123. The light source 23 could be a monochromic light source such as a red light, a blue light or a white light, or a chromatic light source such as a combination of a red light, a blue light and a green light.

The microlens set 22 is disposed at a predetermined position on the light source section 21 and made of a highly transparent polymer material that is formed by UV curing, thermo-compression or injection molding. The microlens set 22 has a size of 10 μm~500 μm in diameter and comprises at least one microlens unit 211 having a specific geometric shape. The microlens unit 211 could be a polygonal structure such as a triangular structure, a rectangular structure, a hexagonal structure or their combination. In this preferred embodiment, the polygonal structure is a hexagonal structure.

Please refer to FIG. 2B for the illustrative view of a light spot formed by the LED display apparatus according to a preferred embodiment of the present invention. When the light emitting diode 212 emits light 23, the light 23 is first processed by the flat microlens 211 to be collimated and converged, and then is being transmitted to the plural microlens units of the microlens set 22 for forming light spots 222, each having a geometric shape identical to the specific geometric shape of the microunit 221. When we view directly at the LED display device with such optical property and package according to the present invention, we can have a comparatively larger and smoother light emitting surface for the viewing effect, compared with the traditional LED display devices.

The forgoing LED display device 2 can be used for different LED devices. For example, when the LED display device 2 is used for the dot matrix LED signal or imaging device (such as traffic lights, taillights or electronic advertising billboards), it provides a maximum viewing area with a minimum quantity of LEDs and enhances the comfort of viewing the information content by using the device to produce smoother images. Further, the packaged microlens unit can effectively control the light emitting angle of the LED.

Figure 3A:
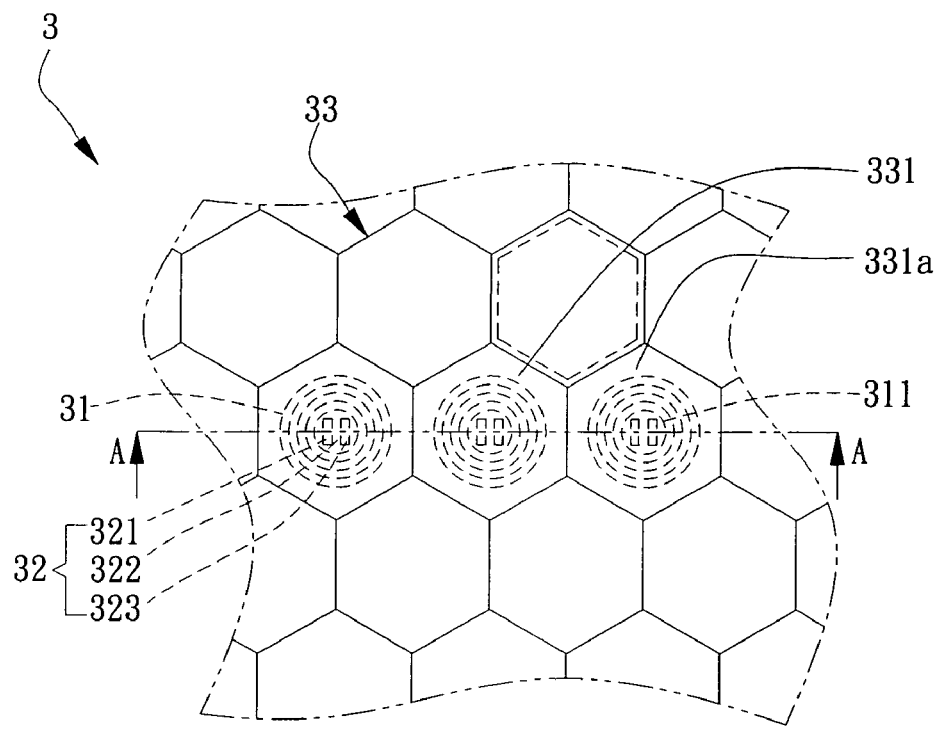
FIG. 3A is a top view of an apparatus of LED flat light signal display having a microlens set according to a preferred embodiment of the present invention.
Figure 3B:
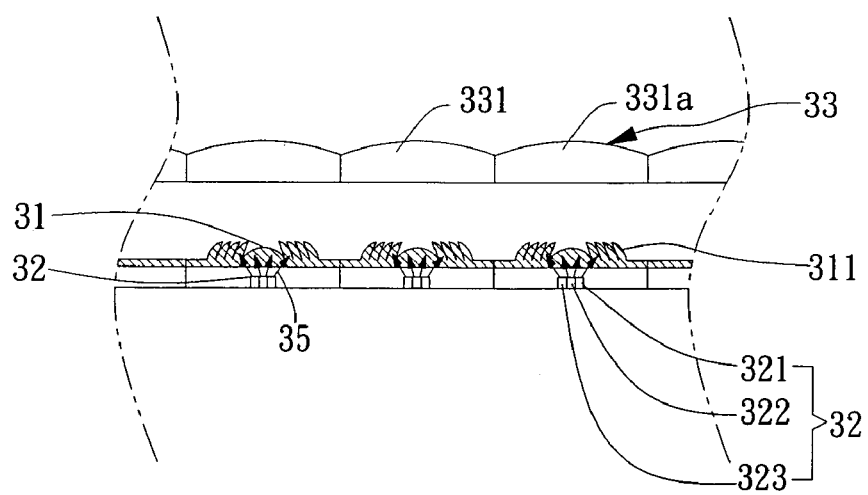
FIG. 3B is a cross-sectional view of Section A—A of an apparatus of LED flat light signal display having a microlens set according to a preferred embodiment of the present invention.

For the sake of clarity, please refer to FIG. 3A for a top view of an apparatus of LED flat light signal display having a microlens set according to a preferred embodiment of the present invention. The flat light signal display device 3 comprises a plurality of flat microlens 31, at least one light emitting diode 32, and a microlens set 33. Please refer to FIG. 3B for a cross-sectional view of Section A—A of an apparatus of LED flat light signal display having a microlens set according to a preferred embodiment of the present invention. The flat microlens 31 has pitch size of 1 μm to 500 μm and comprises a plurality of concentric serrated rings. The light emitting diode 32 is disposed on one side of the flat microlens 31 and includes a red LED 321, a blue LED 322 and a green LED 323. A light source 35 provided by the light emitting diode 32 could be a monochrome light source such as a red light or a blue light, or a chromatic light source such as an integration of a red light, a blue light or a green light.

The microlens set 33 comprises at least one microlens unit 331 having a specific geometric shape and the micro unit 331 has a profile with a hexagonal external edge for receiving the collimated focusing light source of the flat microlens 31 to produce a light spot with a profile of a hexagonal external edge.

A lateral side of the microlens unit 331 is disposed adjacent to a lateral side of another microlens unit 331a to define a geometric plane. The microlens set 33 is made of a highly transparent polymer material by UV curing, thermo-compression or injection molding. Besides the hexagonal shape adopted in this embodiment, the microlens unit 331 could be of other polygonal shapes such as a triangular shape and a rectangular shape for achieving different dispersion effects. Furthermore, a combination of different specific geometric shapes could be used for the microlens sets.

Figure 4A:
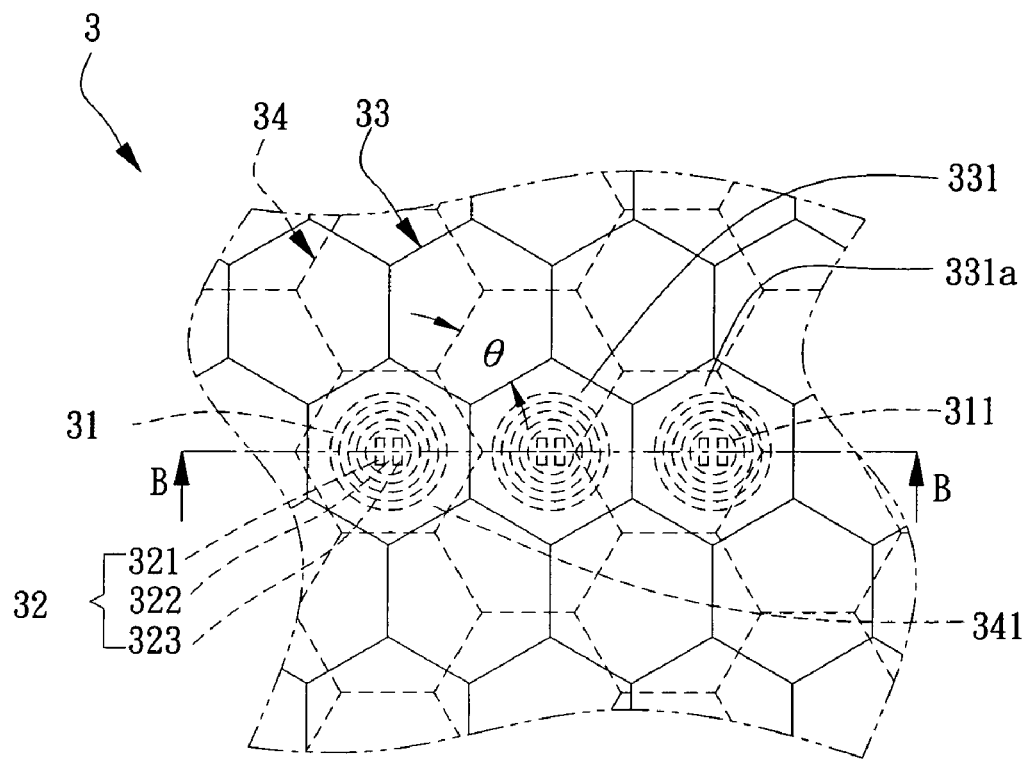
FIG. 4A is a top view of an apparatus of LED flat light signal display having two layers of microlens sets according to a preferred embodiment of the present invention.
Figure 4B:
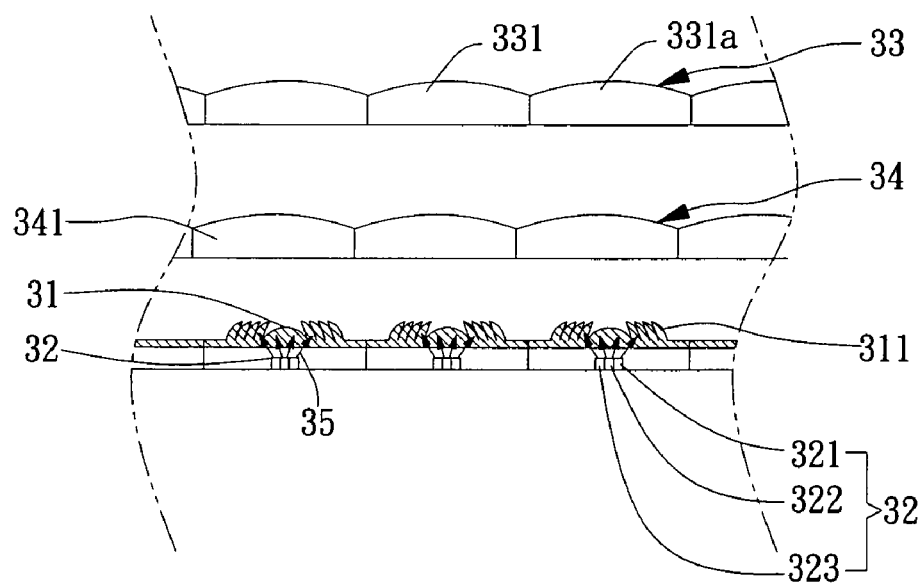
FIG. 4B is a cross-sectional view of Section B—B of an apparatus of LED flat light signal display having two layers of microlens sets according to a preferred embodiment of the present invention.

In addition to the basic combination described above, another microlens set 34 disposed between the microlens set 33 and the flat microlens 31 as shown in FIGS. 4A and 4B is adopted by another preferred embodiment of the present invention; wherein the microlens set 34 can receive the dispersed light source from flat microlens 33 with a rotated angle θ (relative to the diagonal axis of microlens unit 331) such that to perform the displayed images with a smoother and more comfortable viewing effect.

Figure 5A:
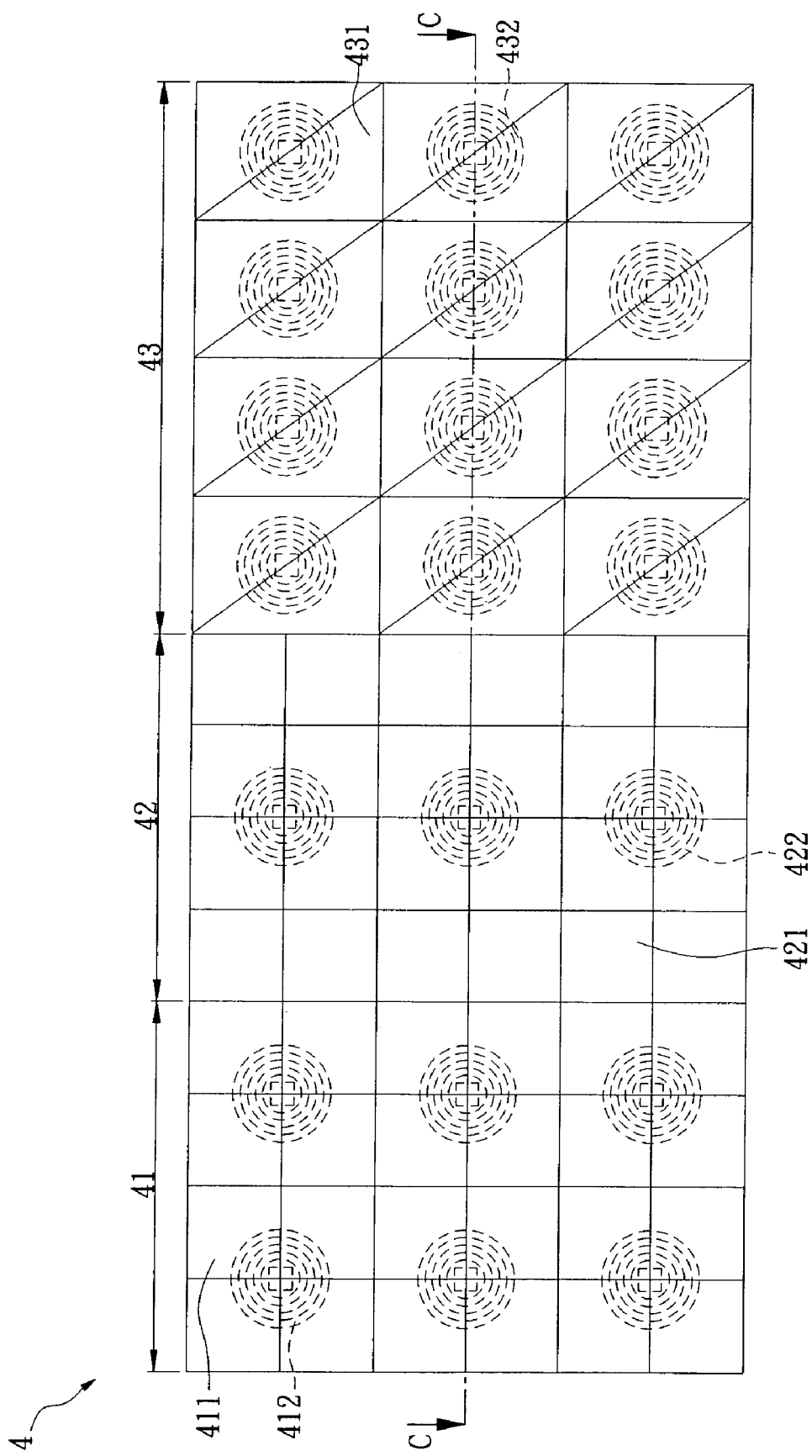
FIG. 5A is a top view of an apparatus of LED flat light signal display showing the formation of the light-emitting surface according to a preferred embodiment of the present invention.
Figure 5B:
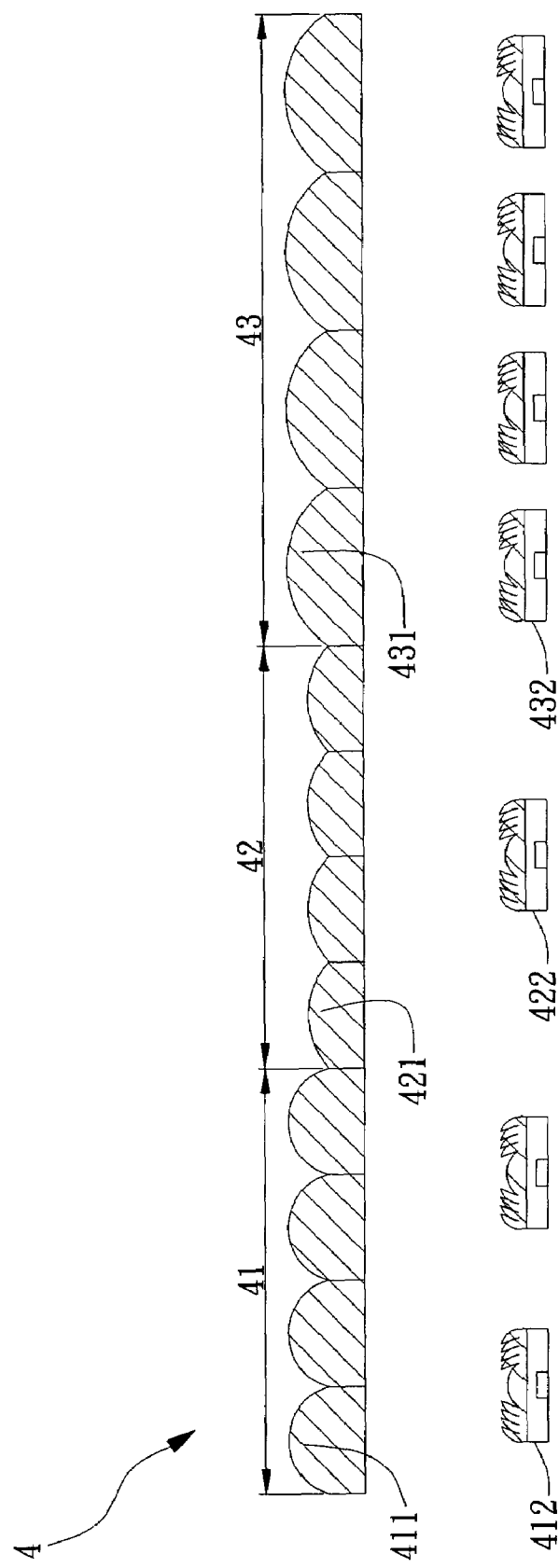
FIG. 5B is a cross-sectional view of Section C—C of an apparatus of LED flat light signal display showing the formation of the light-emitting surface according to a preferred embodiment of the present invention.

Please refer to FIG. 5A for the illustrative view of the display blocks of a flat light signal display being arranged and combined according to a preferred embodiment of the present invention. In FIG. 5A, the flat light signal display 4 comprises a first block 41, a second block 42 and a third block 43. Please refer to FIG. 5B for the cross-sectional view of Section C—C of a flat light signal display being arranged and combined according to a preferred embodiment of the present invention. In FIG. 5B, one lens light source section or a plurality of lens light source sections may be mapped into a block. The first block 41 is defined by arranging a plurality of rectangular lens bodies 411 and a plurality of lens light source bodies 412; the second block 42 is defined by arranging a plurality of rectangular lens bodies 421 and a plurality of lens light source bodies 422; and the third block 43 comprises a plurality of triangular lens bodies 431 and a plurality of lens light source bodies 432. From these embodiments, it is obvious that several blocks can be connected to form the geometric flat device 4, and the specific geometric shape of the microlens bodies 411 could be the same or different.

This invention can be applied in many related areas, and some of the preferred embodiments are described as follows. The combination of this invention (as shown in FIGS. 3A and 4A) can be used for traffic lights, the backlit module of flat display devices, and large LED static or dynamic information display billboards. Red LEDs, blue LEDs and green LEDs are integrated to define a plurality of color combinations for displaying diversified information on traffic lights, the backlit module of flat display devices, and large LED static or dynamic information display billboards.

The present invention can be used for automobile warning lamp devices. If the LED is replaced by a yellow light LED, the signal lights of a motor vehicle are define, and if the LED is replaced by a red light LED, then a brake signal light is defined. Of course, if the LED is replaced by a white light LED, then, the present invention can be used for the backlit module of display devices.

In summation of the description above, the present invention has the easy-to-operate, a simple manufacturing and easy-to-assemble features, and thus can meet with the requirements of the industry and enhances the competitiveness of the industry. The present invention herein enhances the performance than the conventional structure and further complies with the patent application requirements and is submitted to the Patent and Trademark Office for review and granting of the commensurate patent rights.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An apparatus of LED flat light signal display, comprising:

at least one light emitting diode (LED), acted as a light source for emitting light;

a plurality of flat microlens, having a plurality of concentric serrated rings, each flat microlens being capable of collimating and converging light from the light source;

at least one microlens set, comprised of at least one microlens unit with a specific geometric shape, each microlens unit being capable of receiving light transmitted from the flat microlens body to produce a light spot having a geometric shape identical to the micro unit, the external edge of each microlens unit having a lateral side disposed adjacent to another lateral side of the external edge of another microlens, wherein, the assembly of the plural microlens units defines a light-emitting surface.

2. The apparatus of claim 1, wherein the concentric serrated ring has a pitch ranging from 1 µm to 500 µm.

3. The apparatus of claim 1, wherein the light source is selected from the group consisting of a monochrome light source and a chromatic light source.

4. The apparatus of claim 1, wherein the microlens set has a size ranging from 30 µm to 500 µm.

5. The apparatus of claim 1, wherein the microlens unit is a structure of polygonal shape.

6. The apparatus of claim 5, wherein the polygonal shape is a shape selected from the group consisting of triangular, rectangular, hexagonal and hybrid shapes of the same.

7. The apparatus of claim 1, wherein the microlens section is made of a highly transparent polymer material.

8. The apparatus of claim 1, wherein the microlens set is formed by a method selected from the group consisting of UV curing, thermo compression and an injection molding.

9. The apparatus of claim 1, wherein the microlens set further comprises at least a display block, each display block being formed by the formation of the microlens units.

10. The apparatus of claim 9, wherein the microlens unit has a specific geometric shape selected from the group consisting of triangular, rectangular, hexagonal and hybrid shapes of the same.

11. The apparatus of claim 1, wherein the microlens set further comprised of two microlens sets called separately first microlens set and second microlens set. The first microlens set for receives light dispersed from the flat microlens and; and the second microlens set for receiving the adjusted light dispersed from the first microlens set. By rotating the first microlens set by an appropriate angle θ relative to the diagonal axis of the microlens unit in second microlens set to adjust the dispersing direction and angle of the received light.

12. The apparatus of claim 1, wherein the apparatus is a device selected from the group consisting of a traffic light device, an automobile warning lamp, a backlit display device, a large LED dynamic image display device and a large LED static image display device.

* * * * *